United States Patent [15] 3,643,165
Kuribayashi et al. [45] Feb. 15, 1972

[54] MODULATED CARRIER WAVE COMMUNICATION APPARATUS

[72] Inventors: Michio Kuribayashi; Riichi Mimori, both of Tokyo, Japan

[73] Assignee: Nippon Electric Company, Limited, Tokyo, Japan

[22] Filed: Jan. 22, 1970

[21] Appl. No.: 4,805

[30] Foreign Application Priority Data

Jan. 24, 1969 Japan ....................44/4707

[52] U.S. Cl. ....................325/330, 325/49, 325/50, 325/329
[51] Int. Cl. ....................H04b 1/68
[58] Field of Search ....................325/330, 329, 50, 60; 179/15 ST, 1 G, 15 AN

[56] References Cited

UNITED STATES PATENTS

| | | | |
|---|---|---|---|
| 3,411,092 | 11/1968 | Ronne | 325/30 |
| 3,538,259 | 11/1970 | Brahman | 175/15 ST |
| 3,388,336 | 6/1968 | Mattern | 325/330 |
| 3,500,217 | 3/1970 | Auen | 325/329 |

OTHER PUBLICATIONS

Q.S.T., July 1948, pp. 11-15, Figs. 4 and 5 Practical Single-Sideboard Reception

*Primary Examiner*—Benedict V. Safourek
*Assistant Examiner*—Barry L. Leibowitz
*Attorney*—Marn & Jangarathis

[57] ABSTRACT

Apparatus for recovering information signals from modulated carrier waves is provided in accordance with the teachings of the present invention. According to one embodiment of this invention, modulated carrier waves including a first sideband component, a carrier wave component and a portion of a second sideband component are provided. Carrier signal generating means is responsive to the modulated carrier waves for generating a carrier signal of predetermined phase. Two-phase demodulation means, responsive to the carrier signal and a quadrature component thereof recovers the information signals from the modulated carrier waves. Control means responsive to low-frequency signals produced by said two-phase demodulation means generates control signals for adjusting the phase of said carrier signal.

14 Claims, 4 Drawing Figures

INVENTORS
Michio Kuribayashi
Riichi Mimori
BY
Marn & Jangarathis
ATTORNEYS

MODULATED CARRIER WAVE COMMUNICATION APPARATUS

This invention relates to modulated signal communication systems, and more particularly, to apparatus for recovering information signals from modulated carrier waves wherein the phase of said recovered information signals is controlled.

Conventional modulated signal communication systems are readily utilized to broadcast radio, television and other information signals. Some of these systems employ amplitude modulation whereby a carrier signal is amplitude modulated with an information signal producing upper and lower sideband components. Where only one of the sidebands is transmitted, the conventional systems recover the modulated information signal by the well-known independent synchronizing method. This method of recovery is performed at a communication receiving station which includes a demodulator that is supplied with a demodulating carrier signal locally generated by an independent oscillator. One disadvantage accompanying the use of an independent oscillator at the receiver is the introduction of a phase or frequency shift into the recovered information signal with respect to the original information signal because of the variable phase or frequency of the locally generated demodulating carrier signal with respect to the modulating carrier signal. Consequently, the frequency relationship between the fundamental spectrum and the harmonic spectra of the original information signal will no longer exist in the recovered information signal. Accordingly, if the information signal is an audio signal, such as speech or music, the quality of the sound of the recovered information signal is subject to serious deterioration. In addition, the requisite filters employed at the transmitting and receiving stations for the transmission of only a single sideband have sharp cutoff characteristics resulting in substantial delay distortion of the transmitted signals. The delay distortion is an uncontrollable phase shift of a filtered signal which phase shift varies as the bandwidth of the filtered signal varies.

As is well known, the human ear is insensitive to frequency shift or delay distortion in a monophonic signal, and, therefore, conventional broadcasting and information transmission systems have not found it necessary to attack the above described problem. However, relatively minor frequency shifts and delay distortion in stereophonic signals are readily perceived by the average listener and the demodulation of separately transmitted right channel signals and left channel signals by conventional communication systems has resulted in independent phase shifts of the two channel signals which phase shifts are noticeably detected. Further, the frequency characteristics of the transmission filters employed in the conventional single sideband systems produce independent frequency shifts and delay distortion in the right and left channel signals, respectively. Thus it is seen that the original phase and frequency relationships of the two channel signals cannot be maintained throughout the transmission and recovery thereof by conventional communication systems. Because of the use of series connected single sideband modulating and demodulating systems in long distance communication, such as telephone, radio or television transmission, delay distortion, phase shift and frequency shift are compounded so as to be cognizant even in the quality of sound reproduced from recovered monophonic signals.

The prior art has found that the above described frequency shift and phase shift of the recovered information signal may be minimized by communicating a carrier component from the transmitting location to the receiving location jointly with the single sideband component. This carrier component may then be utilized to reproduce the demodulating carrier signal. If the single sideband component is not adequately suppressed at the receiving location, however, the reproduced demodulating carrier signal will be subjected to considerable fluctuation in phase as in the independent synchronizing systems described above. Accordingly, a filter of precise bandwidth must be employed to detect only the carrier component of the received modulated wave. However, as the minimum frequency that may be contained in the single sideband component approaches a low value, i.e., as the frequency separation between the carrier component and the single sideband component is reduced, the more difficult (and the more expensive) it becomes to construct the requisite filter. Hence, if a low-cost, commercially available filter is chosen to extract the carrier component from the received modulated wave, the phase of the extracted carrier component must be automatically adjusted by the DC component of the demodulated signal. As is well known, the cutoff frequency of the low-pass filter used for deriving the DC component must decrease as the minimum frequency that may be contained in the demodulated signal decreases, which tends to increase the time required for adjusting the phase of the extracted carrier component.

Therefore, it is an object of the present invention to provide apparatus for recovering information signals from modulated carrier waves wherein delay distortion and frequency shift of the recovered signals are eliminated.

It is another object of the present invention to provide apparatus for recovering information signals from modulated carrier waves wherein the phase of the recovered signals is maintained in a predetermined relationship.

It is yet another object of the present invention to provide apparatus for recovering information signals from modulated carrier waves wherein the phase of the demodulating carrier signal is automatically adjusted in a minimum amount of time.

Various other objects and advantages of the invention will become clear from the following detailed description of embodiments thereof, and the novel features will be particularly pointed out in connection with the appended claims.

In accordance with this invention apparatus for recovering information signals from modulated carrier waves is provided wherein a carrier component is extracted from the modulated waves and utilized to generate a carrier signal in synchronous relation therewith to demodulate the modulated carrier waves; a low-frequency signal is derived from the demodulated signals which is used to adjust the phase of the generated carrier signal whereby said phase is maintained in a predetermined relationship; and the phase of the generated carrier signal is adjusted in a minimum amount of time to prevent undesirable phase shift, delay distortion and frequency shift in the recovered information signals.

The invention will be more clearly understood by reference to the following detailed description of two embodiments thereof in conjunction with the accompanying drawings in which.

Figures 1, 2, 3, 4:
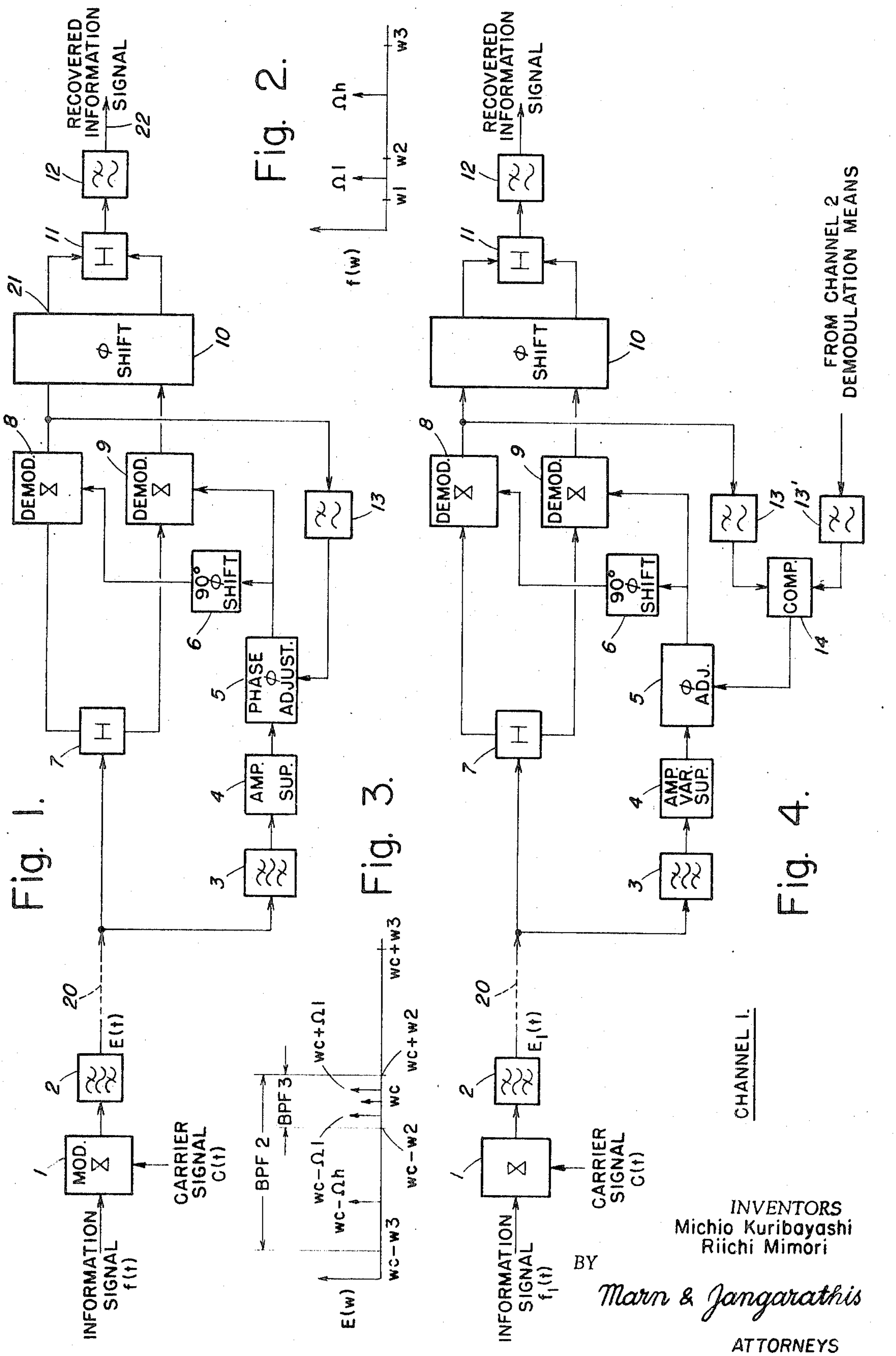
FIG. 1 is a block diagram of an embodiment of the present invention.
FIG. 2 is a graphical representation of the spectral distribution of the information signals that may be transmitted by the apparatus of FIG. 1.
FIG. 3 is a graphical representation of the spectral distribution of the modulated carrier waves that may be transmitted by the apparatus of FIG. 1.
FIG. 4 is a block diagram of another embodiment of the present invention.

Referring now to the drawings, and in particular to FIG. 1, there is illustrated an embodiment of a modulated carrier wave communication system in accordance with the present invention, comprising modulation means 1, filter means 2, carrier wave component extraction means 3, phase adjust means 5, demodulation means 8 and 9, phase adjust control means 13 and phase shift means 10. Modulation means 1 is provided with an information signal $f(t)$ and a carrier signal $C(t)$. The information signal $f(t)$ may be a speech signal, an audio signal or a data signal. Modulation means 1 may be a frequency modulator, a phase modulator or an amplitude modulator. For the purpose of this description modulation means 1 is assumed to be an amplitude modulator; however, as is well understood, the type of modulator chosen is dependent upon the desired application of the present invention. Filter means 2 is connected to modulation means 1 and may be a band-pass filter having a frequency spectrum transmission band adapted to transmit a lower sideband component, a carrier wave component and a portion of an upper sideband component that may be produced by modulation means 1. As is readily appreciated, filter means 2 may, in the alternative, be capable of transmitting an upper sideband component, a carrier wave component and a portion of a lower sideband component produced by modulation means 1. Carrier wave component extraction means 3 is coupled to filter means 2 via transmission line 20 which may be a conventional telephone transmission line, a microwave transmission path, a coaxial cable, a transmission path including a communications space satellite, or other well-known modulated carrier wave transmission path. Carrier wave component extraction means 3 may be a band-pass filter having a frequency spectrum transmission bandwidth less than filter means 2 and preferably centered on the carrier wave component frequency and having well-known point symmetrical phase characteristics with respect to the carrier frequency. Amplitude variation suppression means 4, which may be a conventional amplitude limiting means, couples carrier wave extraction means 3 to an input terminal of phase adjust means 5. Phase adjust means 5 has an additional input terminal connected to low-pass filter means 13 and an output terminal connected through 90° phase shift means 6 to demodulation means 8 and directly to demodulation means 9. Demodulation means 8 and 9 are compatible with modulation means 1 and, therefore, are assumed to be amplitude demodulators for purposes of this description. Demodulators 8 and 9 are coupled to transmission path 20 by conventional hybrid means 7. The output terminal of demodulator 8 is connected to low-pass filter means 13 and to one terminal of phase shift means 10. Demodulator 9 is connected to another terminal of phase shift means 10. Phase shift means 10 is adapted to provide a relative phase shift of 90° between the output signals produced by demodulation means 8 and 9. Accordingly, phase shift means 10 may comprise a conventional 90° phase shifter connected solely to demodulation means 8 or 9; or phase shift means 10 may comprise means to advance the phase of the signal produced by demodulation means 8 and retard the phase of the signal produced by demodulation means 9 or, conversely, retard the phase of the signal produced by demodulation means 8 and advance the phase of the signal produced by demodulation means 9. Conventional hybrid circuit 11 has two input terminals connected to phase shift means 10 for combining the relatively phase-shifted signals produced thereby, and an output terminal connected to low-pass filter means 12.

The operation of FIG. 1 will now be described. It will be assumed that the information signal $f(t)$ has an angular frequency spectrum as graphically represented in FIG. 2 and includes two spectral components of frequencies $\Omega_l$ and $\Omega_h$, respectively. It is further assumed that $\omega_1 \leq \Omega_l \leq \omega_2$, $\omega_2 \leq \Omega_h \leq \omega_3$ and $\omega_1$ is the minimum angular frequency that may be contained in the information signal $f(t)$, $\omega_3$ is the maximum angular frequency that may be contained in the information signal $f(t)$ and $\omega_2$ is an arbitrary angular frequency. Modulation means 1 has been assumed to be a conventional amplitude modulator that modulates carrier wave $C(t)$ of angular frequency $\omega_c$ with information signal $f(t)$ to produce a lower sideband component ($[\omega_c-\Omega_l]$, $[\omega_c-\Omega_h]$), an upper sideband component ($[\omega_c+\Omega_l]$, $[\omega_c+\Omega_h]$), and a carrier component ($\Omega_c$) in the well-known manner. Band-pass filter means 2 has a frequency spectrum transmission band that extends from ($\omega_c-\omega_3$) to ($\omega_c+\omega_2$) and, accordingly, transmits the lower sideband component ($[\omega_c-\Omega_l]$, $[\omega_c-\Omega_h]$), the carrier wave component ($\omega_c$) and a portion of the upper sideband component ($\omega_c+\Omega_l$) of the modulated signal produced by modulation means 1, it being recognized that the spectral component ($\omega_c+\Omega_h$) is suppressed by band-pass filter means 2. The angular frequency spectrum of the signal $E(t)$ applied to transmission path 20 by band-pass filter means 2 is graphically represented in FIG. 3.

A mathematical analysis of the operation of modulation means 1 and band-pass filter means 2 now follows. Information signal $f(t)$ may be expressed as:

$$f(t) = L \sin(\Omega_l t+\theta_l)+B \sin(\Omega_h t+\theta_h) \qquad (1)$$

where $A$ and $\theta_l$ are the amplitude and phase, respectively, of the spectral component having angular frequency $\Omega_h$ and $B$ and $\theta_h$ are the amplitude and phase, respectively, of the spectral component having angular frequency $\Omega_h$. Carrier signal $C(t)$ may be expressed as:

$$C(t)=m \cos \omega_c t \qquad (2)$$

where $m$ is the amplitude of the carrier signal of angular frequency $\omega_c$. Then, the amplitude modulated signal produced by modulation means 1 and supplied to transmission path 20 by band-pass filter means 2 may be expressed as:

$$E(t)=f(t)\,C(t)\ (\text{filtered}) = m \cos \omega_c t+(mA/2) \sin([\omega_c+\Omega_l]t+\theta_l)$$

$$(mA/2) \sin([\omega_c-\Omega_l]t-\theta_l)$$

$$(mB/2) \sin([\omega_c-\Omega_h]t-\theta_h) \qquad (3)$$

where the first term represents the carrier wave component, the second term represents a portion of the upper sideband component, and the third and fourth terms represent the lower sideband component.

Transmission path 20 provides the modulated carrier wave to hybrid circuit 7 and to carrier wave component extraction means 3. As aforesaid, carrier wave component extraction means 3 may comprise a band-pass filter having a frequency spectrum transmission bandwidth less than that of band-pass filter means 2, and preferably having a frequency spectrum transmission bandwidth extending from ($\omega_c-\omega_2$) to ($\omega_c+\omega_2$). Thus, the angular frequency component ($\omega_c-\omega_h$) of the lower sideband which lies without this bandwidth, is suppressed by carrier wave component extraction means 3. In addition, since carrier wave component extraction means 3 has been described as having point symmetrical phase characteristics with respect to the carrier and the signal transmitted thereby may be expressed by the equation $$E'(t)=m' \cos \omega_c t$$

$$+K_1 mA \sin([\omega_c+\Omega_l])t+\theta_l+\phi_1)$$

$$-K_2 mA \sin([\omega_c-\Omega_l])t-\theta_l+\phi_2)$$

It is understood that the definition of point symmetrical phase characteristics requires $K_1=K_2$ and $\phi_1=\phi_2$ and that $K_1 mA$ is substantially less than $m'$. Hence, the vectorial combination of the terms comprising the above equation results in a single component having an angular frequency $\omega_c$. Consequently, a carrier wave component is extracted having only amplitude variations. The amplitude variations are suppressed by amplitude variation suppression means 4, which may be a conventional amplitude limiter, and a rectangular wave carrier signal is generated having the carrier frequency $\omega_c$. Preferably, the rectangular wave, which may be described as the superposition of a fundamental frequency component $\omega_c$ and all odd harmonics thereof, may be filtered by filter means that suppresses the odd harmonics and passes the fundamental frequency component to produce a carrier signal of waveform $\cos \omega_c t$. A quadrature component of the carrier signal $\sin \omega_c t$ is generated by applying the carrier signal $\cos \omega_c t$ to a 90° phase shifting means 6 of well known design. The quadrature component of the carrier signal, $\sin \omega_c t$, is applied to demodulation means 8 to demodulate the modulated carrier wave transmitted thereto from transmission path 20 by conventional hybrid circuit 7. Similarly, carrier signal $\cos \omega_c t$ is applied to demodulation means 9 to demodulate the modulated carrier wave transmitted thereto from transmission path 20 by conventional hybrid circuit 7. Conventional hybrid circuit 7 is an electronic device well known in the prior art that transmits to its output terminals a signal supplied to its input terminal, and need not be further described here.

Demodulation means 8 employs the quadrature component of carrier signal, $\sin \omega_c t$, to demodulate the modulated carrier wave $E(t)$ in the conventional manner. The angular frequency components ($\omega_c-\Omega_l$), $\omega_c$, and ($\omega_c+\Omega_l$) are suppressed in demodulation means 8, and the product of $E(t)$ and $\sin \omega_c t$ that is recovered at the output of demodulation means 8 is $-(mB/4)\cos(\Omega_h t+\theta_h)$. Demodulation means 9 employs the generated carrier signal $\cos \omega_c t$ to demodulate the modulated carrier wave $E(t)$ supplied thereto. The product of $E(t)$ and $\cos \omega_c t$ that is recovered at the output of the demodulation means 9 is $(mA/4)\sin(\Omega_l t+\theta_l)+(mA/4)\sin(\Omega_l t+\theta_l)+(mB/4)\sin(\Omega_h t+\theta_h)$. The signals recovered by demodulation means 8 and 9 are applied to phase shift means 10 which imparts a relative phase shift of 90° to the signals applied thereto. For purposes of this explanation it will be assumed that the signal recovered by demodulation means 8, i.e., $-(mB/4)\cos(\Omega_h t+\theta_h)$, is shifted in phase by 90° to produce the signal $(mB/4)\sin(\Omega_h t+\theta_h)$ at output terminal 21 of phase shift means 10. The recovered signals, after passing through phase shift means 10, are combined in hybrid circuit 11, which may be similar to conventional hybrid circuit 7, to produce the signal $(mA/2)\sin(\Omega_l t+\theta_l)+(mB/2)\sin(\Omega_h t+\theta_h)$, or $(m/2)f(t)$. It is readily seen that hybrid circuit 11 algebraically adds the recovered signals supplied thereto and may comprise, if desired, conventional summing circuit means. Low pass filter means 12 suppresses the higher harmonics that may appear at the output of hybrid circuit 11 and transmits the recovered information signal $f(t)$. Low-pass filter means 12 may include additional conventional circuitry to compensate for the amplitude of the recovered signal combined in hybrid circuit 11 so that the recovered signal appearing at terminal 22 is equal in magnitude to the information signal applied to modulation means 1.

In the foregoing discussion it has been assumed that carrier wave component extraction means 3 is an ideal band-pass filter means and the carrier signal generated by amplitude variation suppression means 4 contains no phase distortion. Accordingly, demodulation means 8 recovers the signal expressed by $-(mB/4)\cos(\Omega_h t+\theta_h)$ which does not contain a low-frequency component. This signal is suppressed by low-pass filter means 13 having a cutoff angular frequency of $\omega_2$ since, as is seen from FIG. 2, $\Omega_h$ is greater than $\omega_2$. However, it has been found that under actual operating conditions, carrier wave component extraction means 3 is not ideal and a phase shift is introduced into the carrier signal generated by amplitude variation suppression means 4 which may be expressed as $\cos(\omega_c t+\phi)$. Accordingly, the signal recovered by demodulation means 8, which is the product of the modulated carrier wave $(E(t)$ and the quadrature component of the phase shifted carrier signal $\sin(\omega_c t+\phi)$, may be represented by the expression $m/2\sin\phi-(mB/4)\cos(\omega_h t+\theta_h+\phi)$. Since the phase shift introduced into the carrier signal may vary slowly with time, the first term of the above expression is a low-frequency signal that is transmitted to phase adjust means 5 by low-pass filter means 13. The phase of the generated carrier signal is adjusted by phase adjust means 5 such that the generated carrier signal tends to remain in phase with the carrier wave component transmitted to carrier wave component extraction means 3 over transmission path 20, and the information signal recovered by demodulation means 8 and 9 tends to remain in phase with the information signal $f(t)$ applied to modulation means 1. It is readily seen that this is accomplished when the low-frequency signal $\sin\phi$, produced by demodulation means 8 and applied to phase adjust means 5 as a control signal, is reduced to zero. When $\sin\phi$ is zero, the phase shift $\phi$ is zero and the proper phase relationships between the generated carrier signal and the carrier wave component and the recovered information signal and the modulated information signal, respectively, are maintained. Hence, phase adjust means 5, demodulation means 8 and low-pass filter means 13 operate as an automatic phase control device whereby the generated carrier signal is phase synchronized with the carrier wave component.

When the modulated carrier wave $E(t)$ is demodulated by the phase shifted carrier signal $\cos(\omega_c t+\phi)$, the recovered information signal may be expressed as:

$$f'(4)=A\sin[\Omega_l(t-\tau_l)+\theta_l+\phi]+B\sin[\Omega_h(t-\tau_h)+\theta_h+\phi]$$

where $\tau_l$ is the delay distortion of the recovered information signal of angular frequency $\Omega_l$, and $\tau_h$ is the delay distortion of the recovered information signal of angular frequency $\Omega_h$. The immediately preceding discussion has explained how the phase shift $\phi$ may be minimized. Explanation of the reduction of the delay distortion $\tau$ now follows. Heretofore, the delay distortion $\tau$ found to exist in prior art single sideband systems was caused principally by the sharp frequency cutoff characteristics of the transmission band-pass filter required for the transmission of only a single sideband. As the filter aged, the delay distortion caused thereby varied. Hence, uniform compensation of the delay distortion was not practical. In accordance with the present invention, however, band-pass filter means 2 need not have such sharp frequency cutoff characteristics since a first sideband component, a carrier wave component and a portion of a second sideband component are transmitted. The delay distortion of this invention, then, is caused mainly by the characteristics of phase shift means 10 which is a stable function of the angular frequency $\Omega$. The value of the delay distortion $\tau$ has been found by experimentation to be uniform and may be expressed as:

$$\tau_l=(1/4)(2\pi/\Omega_l)=1/4f_l$$

$$\tau_h=(1/4)(2\pi/\Omega_h)=1/4f_h$$

and may advantageously be compensated by well-known techniques, commonly used by those skilled in the communications art.

A further advantage of this invention over prior art systems is the minimum time lag required to adjust the phase of the generated carrier signal. Conventional systems transmit only a single sideband containing angular frequency components $(\omega_c-\Omega_l)$ and $(\omega_c-\Omega_h)$ and the information signal recovered by the demodulation means thereof include angular frequencies $\Omega_l$ and $\Omega_h$. Even if a two-phase demodulation technique similar to that of the present invention were to be employed, the output signal of each demodulation means would include both angular frequency components $\Omega_l$ and $\Omega_h$. Thus, if the demodulation means of the present invention were to be incorporated into an automatic carrier signal phase control system, the information signal angular frequencies $\Omega_l$ and $\Omega_h$ must be suppressed. This is readily accomplished by a low-pass filter having a cutoff frequency less than the lowest information signal frequency that may be transmitted. As a result of this low-frequency cutoff characteristic the necessary time for response by an automatic phase control system is severely retarded. The present invention, however, transmits a first sideband and a portion of a second sideband. More specifically, demodulation means 8 has applied thereto the angular frequency components $(\omega_c-\Omega_l)$, $(\omega_c-\Omega_h)$ and $(\omega_c+\Omega_l)$. As described above, the angular frequency components $(\omega_c-\Omega_l)$ and $(\omega_c+\Omega_l)$ tend to cancel each other and demodulation means 8 produces an information signal component having angular frequency $\Omega_h$. Accordingly, low-pass filter means 13 of FIG. 1 must have a cutoff frequency less than $\Omega_h$, such as $\omega_2$, regardless of the minimum information signal frequency that may be transmitted. As $\omega_2$ approaches a higher value, the time within which the automatic phase control system responds decreases. As is readily apparent, the present invention operates satisfactorily for the limiting condition $\omega_2=\omega_3$ which occurs in a double sideband transmission system.

FIG. 1 illustrates an embodiment of the present invention to eliminate phase shift, frequency shift and delay distortion in a monophonic signal. FIG. 4 illustrates another embodiment of the present invention wherein phase shift, frequency shift and delay distortion of a stereophonic signal are eliminated, and comprises one channel, such as the left channel, of a two channel system including modulation means 1, band-pass filter means 2, carrier wave component extraction means 3, phase adjust means 5, demodulation means 8 and 9, first low pass filter means 13, second low-pass filter means 13' and comparator means 14. It should be noted that like reference numerals are used in FIGS. 1 and 4 to identify like components. The apparatus of the one channel of FIG. 4 is electrically connected in a manner similar to that of FIG. 1 and need not be repeated here. It is seen, however, that phase adjust means 5 has an input control terminal connected to comparator means 14 which is connected, in turn, to the output terminals of low-pass filter means 13 and 13'. Low-pass filter means 13', which is similar to low-pass filter means 13, is connected to a demodulation means in the second channel, not shown, similar to demodulation means 8 of the first channel. For the purposes of simplicity, the second channel of the stereophonic signal communication system is not shown as it is complementary to the illustrated first channel.

The operation of the embodiment of FIG. 4 will now be described. It is well known that in stereophonic transmission, the difference in phase between the recovered information signals of each channel must be minimized. In other words, the recovered information signals of the first channel must be in phase, or nearly in phase, with the recovered information signals of the second channel. The embodiment illustrated in FIG. 4 maintains the proper phase relationship between the two channels in the following manner. If the carrier signal generated in channel 1 is assumed to have a phase shift imparted thereto, it may be expressed as $\cos(\omega_c t+\phi_1)$. Accordingly, the signal produced by demodulation means 8 is similar to the signal produced by demodulation means 8 of FIG. 1 and appears as $(m/2)\sin\phi_1-(mB/4)\cos(\Omega_h t+\theta_h+\phi_1)$. The component $(m/2)\sin\phi_1$, is a slowly varying signal and is applied to a first terminal of comparator means 14 by low-pass filter means 13. If the carrier signal of channel 2 is assumed to be of amplitude $m$, then the demodulation means in channel 2 that is complementary to demodulation means 8 in channel 1 will produce a signal having a component $(m/2)\sin\phi_2$ that is also a slowly varying signal which is applied to a second terminal of comparator means 14 by low-pass means 13'. It is understood that $\phi_1$ is the phase difference between the generated carrier signal and received carrier wave component of channel 1, and $\phi_2$ is the phase difference between the generated carrier signal and received carrier wave component of channel 2. Phase differences $\phi_1$ and $\phi_2$ may vary independently of each other. Comparator means 14 may be a conventional substracting circuit or differential amplifier, and produces a signal proportional to the difference in magnitudes of the signals applied thereto by low-pass filter means 13 and 13'. Hence, the signal produced by comparator means 14 is indicative of the difference in phase between the stereophonic information signals recovered in channel 1 and the stereophonic information signals recovered in channel 2. This signal is applied as a control signal to phase adjust means 5 which adjusts the phase of the generated carrier signal of channel 1 such that the latter carrier signal tends to remain in phase with the generated carrier signal of channel 2. It is readily apparent that when the generated carrier signals of channels 1 and 2 are in phase the recovered stereophonic information signals of channels 1 and 2 are in phase, $\phi_1=\phi_2$, $(m/2)\sin\phi_1=(m/2)\sin\phi_2$ and the control signal produced by comparator means 14 has zero magnitude.

As aforedescribed with reference to FIG. 1, the delay distortion imparted to the recovered information signals by the apparatus of the present invention is caused mainly by the characteristics of phase shift means 10 and is a stable function of the angular frequency $\Omega$. Similarly, the delay distortion found to exist in the two channel stereophonic transmission system of the present invention, illustrated in FIG. 4, evolves principally from the phase shift means 10 in channel 1 and the complementary phase shift means in channel 2. Since the phase shift means in each channel may be of homologous design, the delay distortion attributed to each phase shift means has been found to be identical and may be expressed as:

$$\tau_{l1}=\tau_{l2}=(1/4)(2\pi/\Omega_l)=1/4f_l$$

$$\tau_{h1}=\tau_{h2}=(1/4)(2\pi/\Omega_h)=1/4f_h$$

where $\tau_{l1}$ is the delay distortion of the recovered information signal of channel 1 of angular frequency $\Omega_1$ $\tau_{l2}$ is the delay distortion of the recovered information signal of channel 2 of angular frequency $\Omega_l$, $\tau_{h1}$ is the delay distortion of the recovered information signal of channel 1 of angular frequency $\Omega_h$ and $\tau_{h2}$ is the delay distortion of the recovered information signal of channel 2 of angular frequency $\Omega_h$. It is now manifest that this uniform delay distortion may be countervailed by conventional techniques employed by those skilled in the art.

It should be apparent to those of ordinary skill in the art that the instant invention admits of a plurality of alterations and modifications which is no way change the basic teachings thereof. For instance, the modulated carrier wave may be modified to contain an upper sideband component, a portion of a lower sideband component and a carrier wave component. The phase of the generated carrier signal would be controlled in the same manner as illustrated in FIGS. 1 and 4. Further, the carrier signal employed to demodulate the modulated carrier wave may be generated by a synchronizing oscillator with synchronization feedback control.

While the invention has been particularly shown and described with reference to two specific embodiments thereof, it will be obvious to those skilled in the art that the foregoing and various other changes and modifications in form and details may be made without departing from the spirit and scope of the invention. It is, therefore, intended that the appended claims be interpreted as including all such changes and modifications.

What is claimed is:

1. Apparatus for recovering information signals from modulated carrier waves containing a first sideband component a portion of a second sideband component and a carrier wave component, said first and second sideband components being obtained by amplitude modulating said carrier wave component with said information signals, said portion of a second sideband component existing in a frequency range between said carrier wave component and a predetermined frequency included in said second sideband component, comprising:

means for providing said modulated carrier waves;

means coupled to said providing means for generating a carrier signal in synchronous relationship with said carrier wave component and including band-pass filter means having a frequency spectrum transmission band centered on the frequency of said carrier wave component for extracting said carrier wave component from said modulated carrier waves, said frequency spectrum transmission band being no wider than twice the bandwidth between the frequency of said carrier wave component and said predetermined frequency and including a part of said portion of a second sideband component in the vicinity of said carrier wave component; and demodulation means coupled to said providing means and said generating means and responsive to said generated carrier signal and to a quadrature component of said generated carrier signal for demodulating said first sideband component to recover said information signals therefrom.

2. Apparatus in accordance with claim 1 wherein said means for generating a carrier signal further comprises:

means coupled to said band-pass filter means and responsive to said carrier wave component for generating a carrier signal of constant amplitude;

phase adjusting means coupled to said last-mentioned means for maintaining the phase of said generated carrier signal in a predetermined relationship; and control means having an input terminal connected to said demodulation means and an output terminal connected to said phase-adjusting means, said control means being responsive to a low-frequency signal produced by said demodulation means when the phase of said generated carrier signal differs from said predetermined relationship for providing control signals adapted to control said phase-adjusting means.

3. Apparatus in accordance with claim 2 wherein said control means comprises low-pass filter means connected to said demodulation means, and wherein said control signals provided by said low-pass filter means control said phase-adjusting means sue that said low-frequency signal produced by said demodulation means is minimized when said generated carrier signal is in phase with said carrier wave component.

4. Apparatus in accordance with claim 3 wherein said demodulation means comprises:

a first demodulator responsive to said generated carrier sign N demodulating said first sideband component to recover a first portion of said information signals;

a second demodulator responsive to said quadrature component of said generated carrier signal for demodulating said first sideband component to recover a second portion of said information signals; and means coupled to said first and second demodulators for combining said recovered first and second portions of said information signals.

5. Apparatus in accordance with claim 4 wherein said means for combining comprises:

phase shift means coupled to said first and second demodulators for shifting the phase of one of said recovered portions of said information signals by 90° with respect to he other recovered portion of said information signals; and means coupled to said phase shift means for adding said 90° phase shifted recovered portion of said information signals and said other recovered portion of said information signals.

6. Multichannel carrier communication apparatus comprising:

means for providing carrier waves modulated with first and second channel information signals, said modulated carrier waves including a first sideband component, a portion of a second sideband component and a carrier wave component, said first and second sideband components being obtained by amplitude modulating said carrier wave component with said information signals, said portion of a second sideband component existing in a frequency range between said carrier wave component and a predetermined frequency included in said second sideband component;

carrier signal generating means coupled to said means for providing modulated carrier waves for generating a carrier signal having a predetermined phase and including band-pass filter means having a frequency spectrum transmission band centered on the frequency of said carrier wave component for extracting said carrier wave component from said modulated carrier waves, said frequency spectrum transmission band being no wider than twice the bandwidth between the frequency of said carrier wave component and said predetermined frequency and including a part of said portion of a second sideband component in the vicinity of said carrier wave component;

first demodulation means coupled to said means for providing modulated carrier waves and said carrier signal-generating means and responsive to said carrier signal and a quadrature component of said carrier signal for demodulating said modulated carrier waves to recover said first channel information signals therefrom; and second demodulation means coupled to said means for providing modulated carrier waves for demodulating said modulated carrier waves to recover said second channel information signals.

7. Multichannel carrier communication apparatus in accordance with claim 6 wherein said carrier signal-generating means further comprises:

means coupled to said band-pass filter means for adjusting the phase of said carrier signal; and control means coupled to said first and second demodulation means and responsive to low-frequency signals produced thereby for supplying phase control signals to said means for adjusting the phase of said carrier signal.

8. Multichannel carrier communication apparatus in accordance with claim 7 wherein said control means comprises:

first low-pass filter means connected to said first demodulation means for transmitting the low-frequency signal produced thereby;

second low-pass filter means connected to said second demodulation means for transmitting the low-frequency signal produced thereby; and comparator means coupled to said first and second low-pass filter means for producing said phase control signals such that the magnitude of said phase control signals is minimized when said first channel information signals are in phase with said second channel information signals.

9. Multichannel carrier communication apparatus in accordance with claim 8 wherein said first demodulation means comprises:

a first demodulator responsive to said carrier signal for demodulating said modulated carrier waves to recover a first portion of said first channel information signals;

a second demodulator responsive to said quadrature component of said carrier signal for demodulating said modulated carrier waves to recover a second portion of said first channel information signals;

demod phase shift means coupled to said first and second demodulators for shifting the phase of one of said recovered portions of said first channel information signals by 90° with respect to the other recovered portion of said first channel information signals; and means coupled to said phase shift means for adding said 90° phase shifted recovered portion of said first channel information signals and said other recovered portion of said first channel information signals.

10. A modulated carrier wave communications system comprising:

a transmitting station;

a receiving station;

a transmission path interconnecting said transmitting and receiving stations;

said transmitting station comprising:

modulation means for modulating a carrier wave with an information signal to produce a first sideband component, a second sideband component and a carrier wave component; and band-pass filter means coupled to said modulation means for transmitting said first sideband component, said carrier wave component and a portion of said second sideband component to said transmission path whereby said portion of said second sideband component is disposed in the frequency range between said carrier wave component and a predetermined frequency included in said second sideband component;

and said receiving station comprises:

carrier signal-generating means coupled to said transmission path for detecting said carrier wave component and generating a carrier signal having a predetermined phase relationship, said carrier signal-generating means including band-pass filter means having a frequency spectrum transmission band centered on the frequency of said carrier wave component for extracting said carrier wave component from said modulated carrier waves, said frequency spectrum transmission band being no wider than twice the bandwidth between the frequency of said carrier wave component and said predetermined frequency and including a part of said portion of said second sideband component in the vicinity of said carrier wave component;

two-phase demodulation means coupled to said transmission path and responsive to said generated carrier signal for recovering the information signal from said modulated carrier wave; and control means coupled to said two-phase demodulation means for maintaining the predetermined phase relationship of said generated carrier signal.

11. The apparatus of claim 10 wherein said carrier signal-generating means further comprises:

amplitude variation suppression means coupled to said band-pass filter means for generating a carrier signal of constant amplitude; and phase adjust means coupled to said amplitude variation suppression means and responsive to a control signal for providing said carrier signal with said predetermined phase relationship.

12. The apparatus of claim 11 wherein said control means comprises low-pass filter means having an output coupled to said phase adjust means and having a cutoff frequency greater than the lowest frequency component that may be contained in said information signal, said low-pass filter means being responsive to a slowly varying signal produced by said demodulation means for generating said control signal.

13. The apparatus of claim 10 wherein said two-phase demodulation means comprises:

a first demodulator coupled to said transmission path and responsive to a quadrature component of said generated carrier signal for recovering a first portion of said information signal from said modulated carrier wave;

a second demodulator coupled to said transmission path and responsive to said generated carrier signal for recovering a second portion of said information signal from said modulated carrier wave;

phase shift means coupled to said first and second demodulators for shifting the phase of one of said recovered portions of said information signal by 90° with respect to the other recovered portion of said information signal; and means coupled to said phase shift means for combining said 90° phase shifted recovered portion of said information signal and said other recovered portion of said information signal.

14. The apparatus of claim 13 wherein said control means comprises low-pass filter means having an input terminal coupled to said first demodulator and an output terminal coupled to said carrier generating means, said low-pass filter means having a cutoff frequency characteristic that exceeds the lowest frequency component that may be contained in said information signal for generating a phase control signal in response to a slowly varying signal produced by said first demodulator.

* * * * *